Dec. 28, 1954  B. W. WEISEL  2,698,202
WHEEL MOUNTING STRUCTURE
Filed May 15, 1952
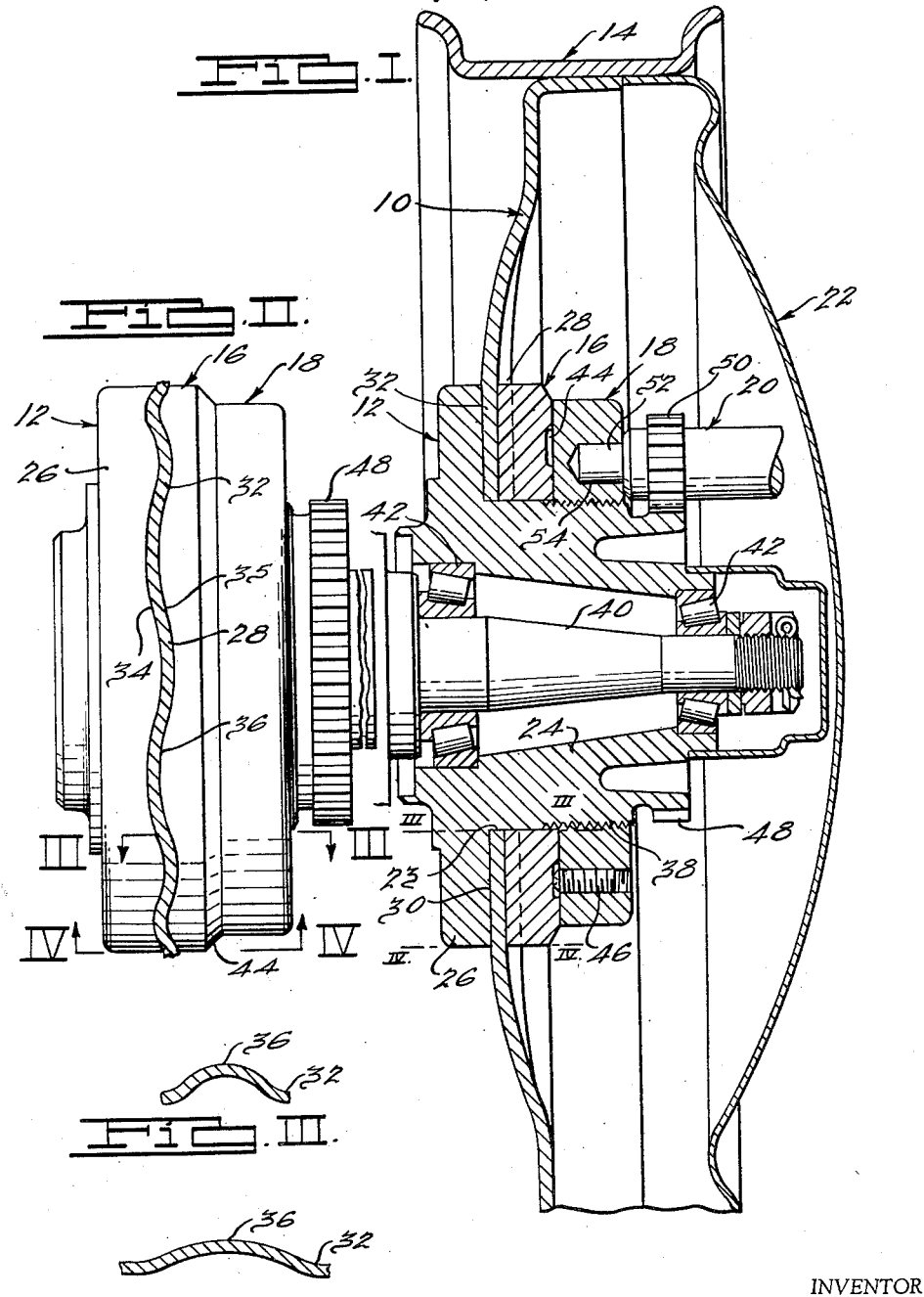
INVENTOR
*Burt W. Weisel.*
BY
ATTORNEY

United States Patent Office 2,698,202
Patented Dec. 28, 1954

2,698,202

WHEEL MOUNTING STRUCTURE

Burt W. Weisel, Jackson, Mich.

Application May 15, 1952, Serial No. 287,884

2 Claims. (Cl. 301—9)

This invention relates to disc wheels for vehicles.

It is the usual practice to secure vehicle disc wheels in position by a series of bolts provided upon a hub and upon which bolts the wheel is piloted and secured by nuts which have to be separately actuated in order to mount or demount the wheel.

Proposals have been made, however, to obviate this necessity of actuating a number of securing nuts by providing that the disc wheel should be secured upon the wheel hub by a single securing nut and by providing that the desired driving connection shall be taken through inter-engaging surfaces on the disc part of the wheel and on the hub, with the said disc part functioning as a pressure disc actuated by tightening of the securing nut.

It is an object of the present invention to improve upon these prior proposals by providing a wheel and mounting structure with which the wheel can be mounted and demounted by a single actuating operation capable of being performed with mechanical advantage and in which the desired rotative driving connection between the wheel disc and the hub is effected in a positive and improved manner, with a novel combination of parts compared with the previous proposals.

Further objects and advantages of the invention residing in the construction, arrangement and combination of parts will appear clear from a consideration of the following detail description of one form of the invention with reference to the accompanying drawings and from the appended claims.

In the drawings:

Fig. I is a vertical section of a wheel and hub mounting structure in accordance with the invention, with the lower portion of the wheel shown broken away, Fig. II is a fragmentary vertical section of the hub mounting parts, Fig. III is a transverse section showing the extent of the mating corrugated portions of the wheel disc near its inner peripheral portion, substantially on the line III—III in Fig. II, and Fig. IV is a similar view to Fig. III taken substantially on the line IV—IV.

Referring to the drawings, 10 indicates generally the wheel disc, 12 the wheel hub, 14 the wheel rim, 16 a pressure ring, 18 a rotary ring nut, 20 a socket and pinion wrench, and 22 the removable wheel cover plate.

The wheel disc has a central opening 23 capable of being slid over the hub portion 24 into abutting relationship with respect to a radial hub flange 26. The flange 26, on the surface thereof presented to the disc 10, is machined to provide an undulated surface comprised by a series of radially extending spoke-like symmetrical dells 36 of progressively increasing width radially outwards, as seen in Figs. III and IV, but of constant depth along their central radii. The surface of the pressure ring 16, presented to the disc 10, is machined in like manner to the said flange surface, with the dells thereof indicated at 35, whereas the inner peripheral portion 32 of the wheel disc 10, as retained between the said flange and pressure ring flanges, is die formed with corresponding radially extending dells 36. The result of these machining and die forming operations is to form symmetrical surface undulations which have synchromesh engagement with one another upon tightening the pressure ring 18 and provide a positive drive connection in either direction of rotation of the wheel hub 12.

The wheel hub portion 24 has an externally screw-threaded end portion 38 over which the pressure ring 16 is slidable and which serves to receive the interiorly screw-threaded ring nut 18. The hub portion 24 is hollow and is mounted on the stub axle 40 through the bearings 42.

The pressure ring is also slidable over the hub portion 24 and on its outer face is formed with an annular recess 44 for reducing wear thereon through the engagement therewith of the ring nut 18 and for receiving the inner ends of aligned axial locking screws 46, secured in ring nut 18. At its outer end, and around its outer periphery, the hub portion 24 is formed with gear teeth 48 with which a pinion 50 on the wrench 20 is engageable. The wrench has a socket end portion 52 engageable in an axial socket opening 54 in the ring nut when it is desired to actuate the nut 18 to mount or demount the wheel.

With the parts assembled as shown in Fig. I, to demount the wheel, the socket wrench 20, previously inserted into one of the socket openings 54 for such purpose, with its pinion 50 engaged with the gear ring 48 and with the locking screws 46 withdrawn from the recess 44, is rotated. This causes the pinion to roll around the gear ring with a mechanical advantage and at the same time constrains the ring nut 18 to be unscrewed with respect to the screw-threading 38 on the hub portion 24, it being understood that the cover plate 22 has been removed beforehand. When the ring nut has been removed it is a simple matter to slide the pressure ring 16 and wheel disc 10 off the hub portion 42. It will be appreciated, therefore, that the wheel can be demounted in an easy and rapid manner. The same applies to the mounting of the wheel. When this takes place, and upon the ring nut being screwed up tightly against the pressure ring 16, so as firmly to engage the complementary corrugations 34, 35, 36, the screw studs 46 are screwed into the recess 44 to lock the pressure ring 16 and ring nut 18 together against unintentional loosening due to vibration and the like.

Having thus described my invention, what I claim as novel and wish to secure by Letters Patent is as follows:

1. A wheel structure comprising in combination, a hub having an externally screw-threaded portion, a radial flange and an external gear ring at the outer hub end, said screw-threaded portion being intermediate the flange and ring gear, a wheel disc and a pressure ring both axially slidable upon said hub, said hub flange, wheel disc and pressure ring having synchro-mesh mating surfaces extending radially upon their adjacent surface portions when in assembled relation, a ring nut engageable with said screw-threaded hub portion and pressure ring to urge the pressure ring axially to engage said surfaces in rotation transmitting relation, said pressure ring having a recess in its outer surface presented to said ring nut and the latter having an opening for the insertion of a socket wrench having a pinion engageable with said hub ring gear to rotate said ring nut, said ring nut carrying releasable lock screw means engageable in said pressure ring recess to hold the ring nut against relative rotation when tightened against said pressure ring.

2. A wheel structure comprising a hub part having an externally screw-threaded portion and a radial flange, a wheel disc slidable upon said hub portion, a pressure ring also slidable upon said hub portion, a ring nut engageable with said screw-threaded hub portion and pressure ring to tighten said wheel disc against said hub flange, said flange, wheel disc and pressure ring having inter-fitting undulated surfaces, said surfaces extending radially in continuous circumferential arrangement, releasable lock means for securing said ring nut against rotation relatively to said pressure ring, said hub having an external gear ring at one end and said ring nut having an opening for receiving a socket wrench with a pinion engaging said gear ring.

References Cited in the file of this patent

UNITED STATES PATENTS

| Number | Name | Date |
|---|---|---|
| 1,483,641 | Montgomery | Feb. 12, 1924 |
| 1,491,559 | Slick | Apr. 22, 1924 |
| 1,602,984 | McFall | Oct. 12, 1926 |